(No Model.)  5 Sheets—Sheet 1.
M. LANCASTER.
APPARATUS FOR THE SEPARATION OR EXTRACTION OF OIL FROM VEGETABLE SUBSTANCES.
No. 253,722. Patented Feb. 14, 1882.
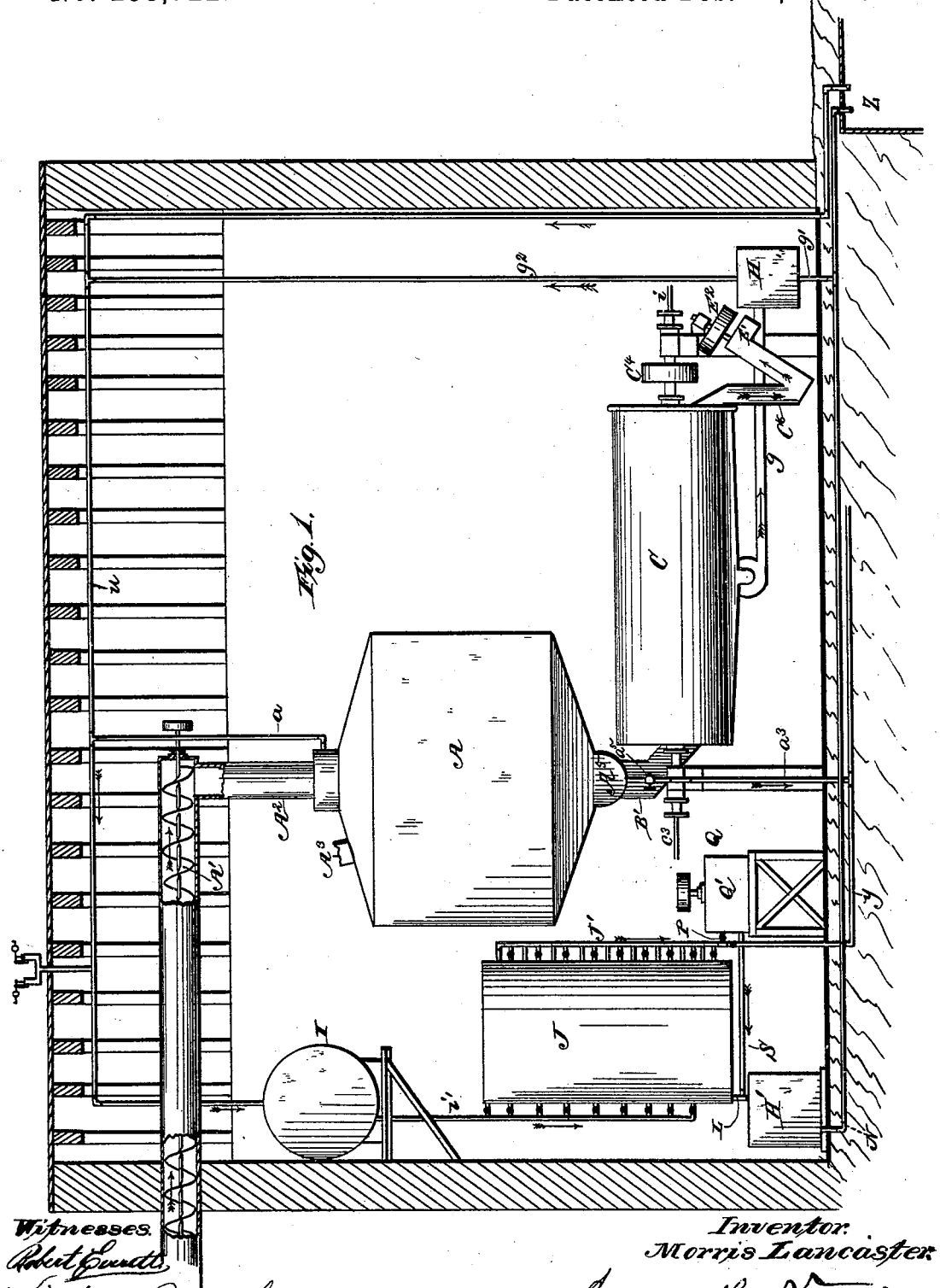
Witnesses.  Inventor:
Morris Lancaster
By James L. Norris.
Atty

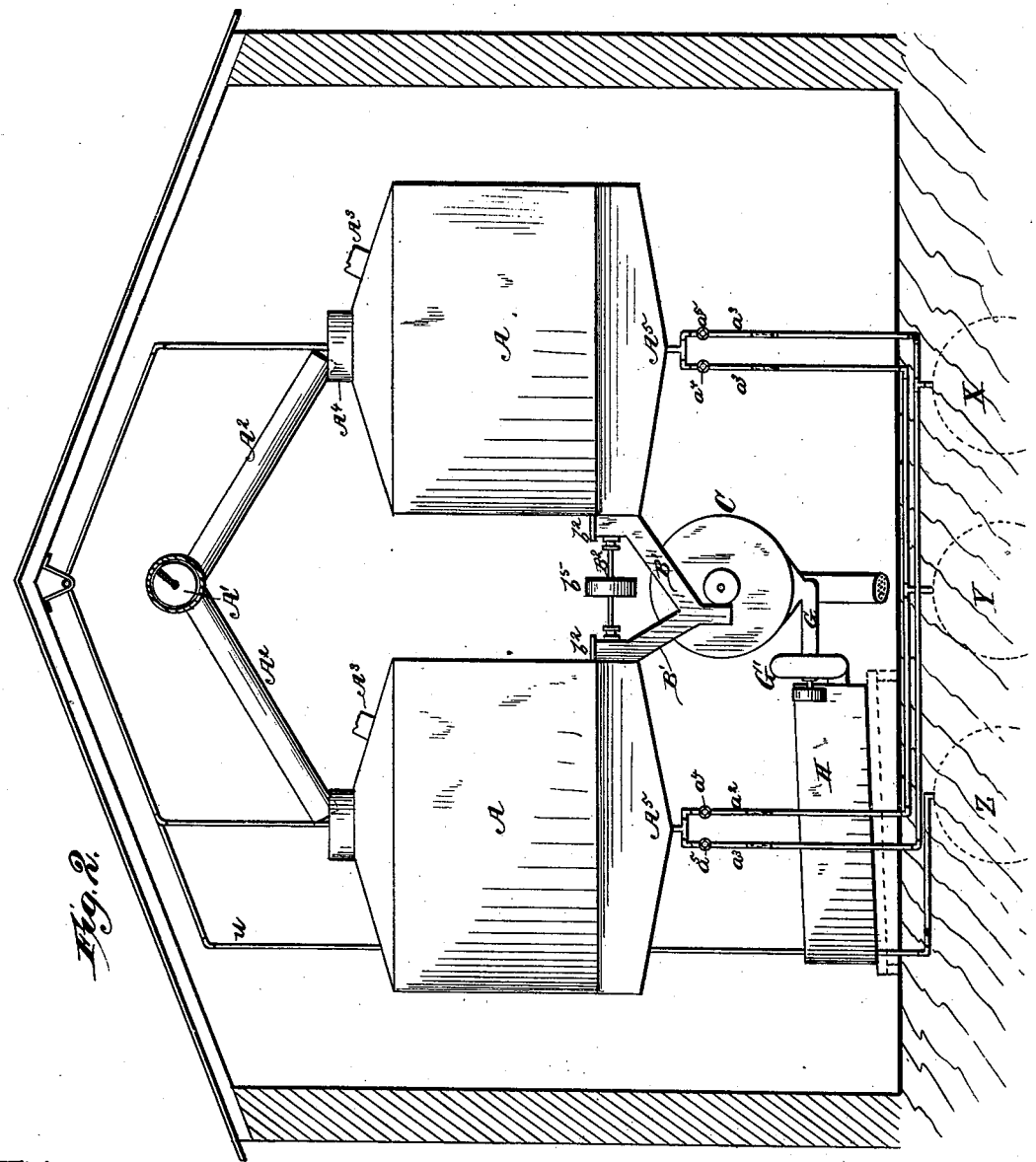

(No Model.) 5 Sheets—Sheet 3.
M. LANCASTER.
APPARATUS FOR THE SEPARATION OR EXTRACTION OF OIL FROM VEGETABLE SUBSTANCES.
No. 253,722. Patented Feb. 14, 1882.
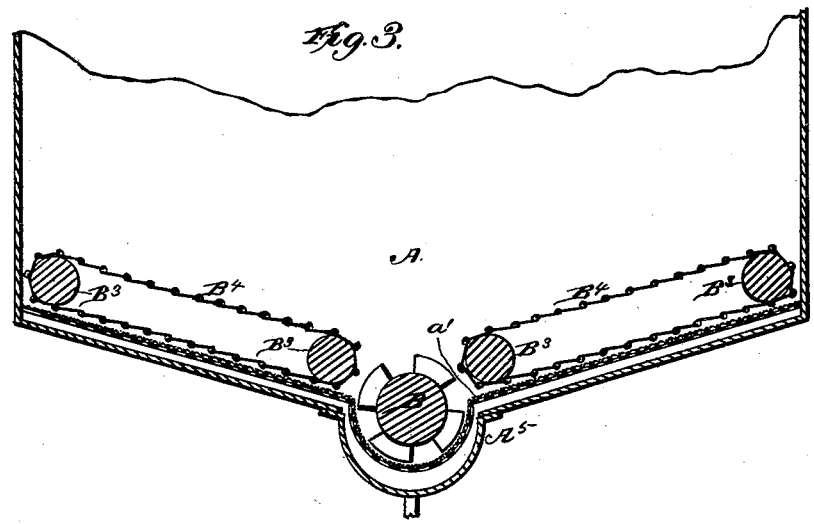
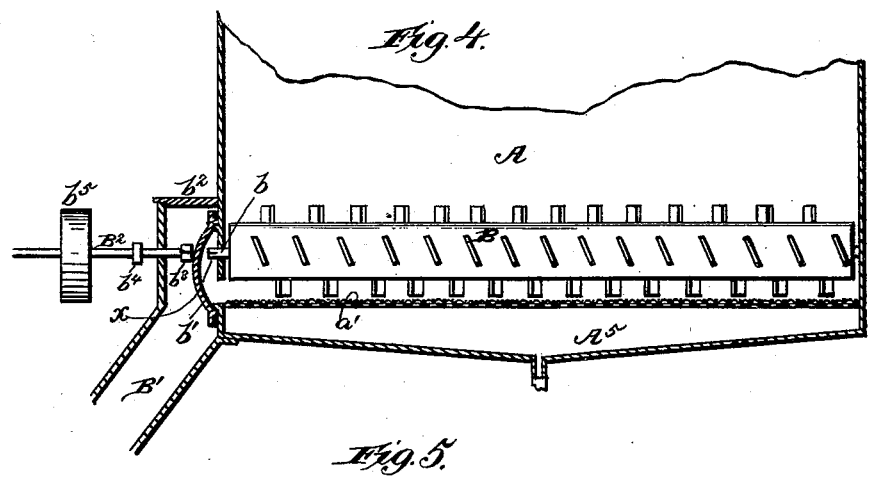
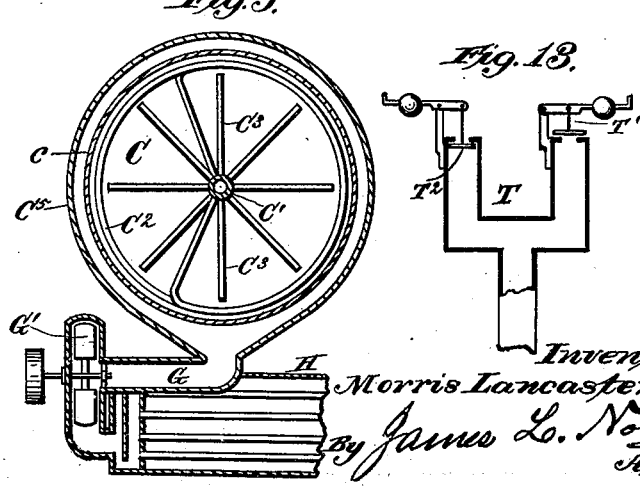

(No Model.) 5 Sheets—Sheet 4.
M. LANCASTER.
APPARATUS FOR THE SEPARATION OR EXTRACTION OF OIL FROM VEGETABLE SUBSTANCES.
No. 253,722. Patented Feb. 14, 1882.
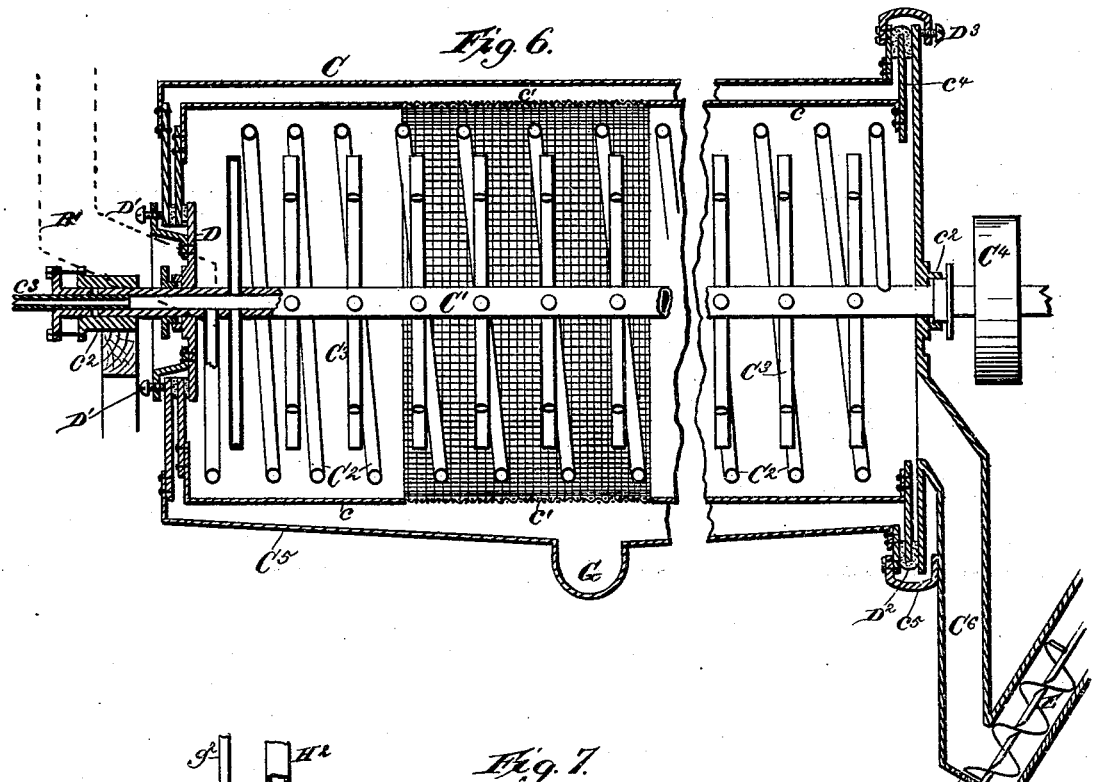
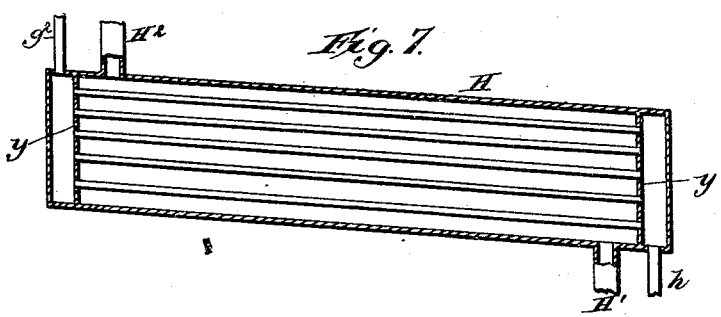
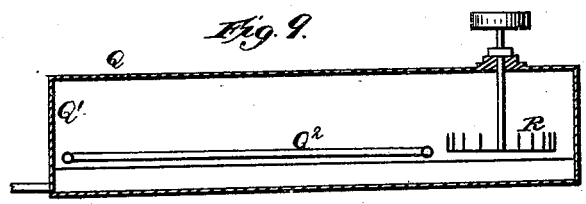
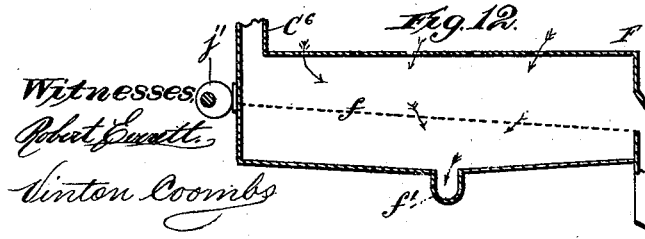
Witnesses
Robert Burett
Vinton Coombs
Inventor
Morris Lancaster.
By James L. Norris.
Atty.

(No Model.) 5 Sheets—Sheet 5.
M. LANCASTER.
APPARATUS FOR THE SEPARATION OR EXTRACTION OF OIL FROM VEGETABLE SUBSTANCES.

No. 253,722. Patented Feb. 14, 1882.

Witnesses
Robert Everett
Vinton Coombs

Inventor
Morris Lancaster
By James L. Norris
Atty

UNITED STATES PATENT OFFICE.

MORRIS LANCASTER, OF RICHMOND, INDIANA, ASSIGNOR OF TWO-THIRDS TO WILLIAM N. MATTHEWS AND WILLIAM MENDENHALL, BOTH OF SAME PLACE.

APPARATUS FOR THE SEPARATION OR EXTRACTION OF OIL FROM VEGETABLE SUBSTANCES.

SPECIFICATION forming part of Letters Patent No. 253,722, dated February 14, 1882.

Application filed September 7, 1881. (No model.)

*To all whom it may concern:*

Be it known that I, MORRIS LANCASTER, a citizen of the United States, residing at Richmond, in the county of Wayne and State of Indiana, have invented new and useful Improvements in Apparatus for the Separation or Extraction of Oil from Vegetable Substances, of which the following is a specification.

My invention consists in the improved manner of extracting the oil from vegetable substances—such as flaxseed, &c.—and in certain novel organizations of apparatus, which will hereinafter be fully set forth.

Figure 10:
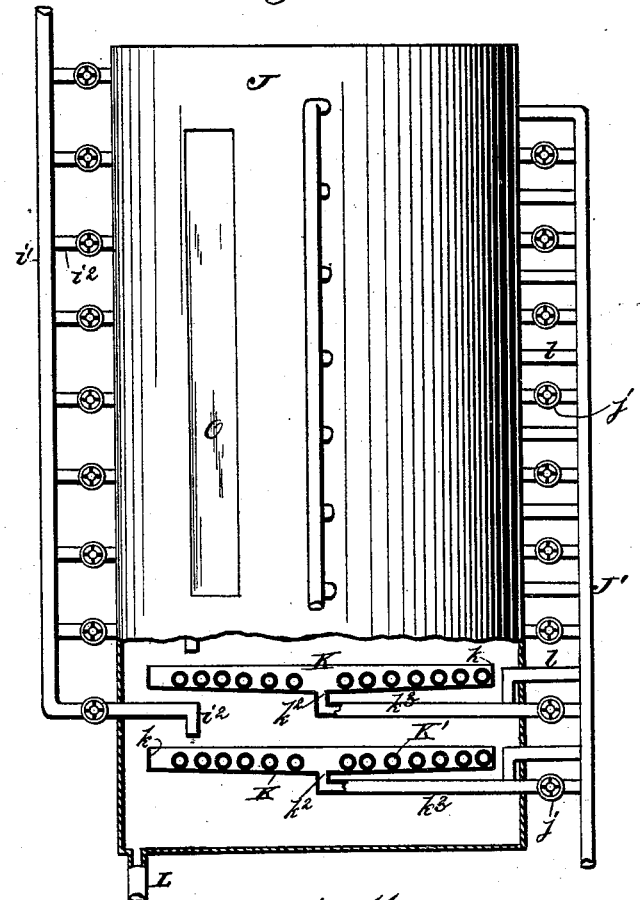
Figure 11:
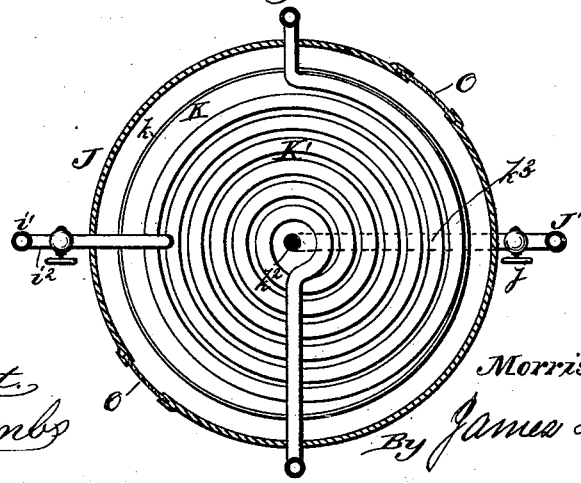

In the accompanying drawings, Figure 1 is a vertical side elevation through my apparatus, partly in section. Fig. 2 is an end elevation. Fig. 3 is a transverse section of one of the separating or extracting tanks. Fig. 4 is a section of the same taken at right angles to Fig. 3. Fig. 5 is a section showing the connection between the evaporator and the condenser and the fan therein. Fig. 6 is a longitudinal section through the same. Fig. 7 is a longitudinal section through one of the condensers. Fig. 8 is a transverse section of the superheater for finally treating the oil. Fig. 9 is a longitudinal section of the same. Fig. 10 is an elevation, partly in section, of the solvent-separator. Fig. 11 is a transverse section through the same. Fig. 12 is a view showing a modified construction of the evaporator. Fig. 13 is a detail view, showing the valves on the branched outlet or ventilator pipes.

A room thirty by thirty-two feet, with walls eighteen feet high, is ample size, owing to the inflammable and explosive nature of most solvents that it is practical to use. The floor of this building should be of concrete, brick, or stone, and the roof composed of metal. All tanks for the storage of the solvent should be placed in the ground outside of this room, as shown. The vegetable matter to be operated on should also be stored, and all grinding done in an adjoining room separated by a heavy firewall, through which there should be no openings, except one for an iron-cased screw-conveyer for bringing the meal into the room and another to take it out. These should be closely embedded in the wall where they pass through. With these precautions and ordinary care in working a serious fire or explosion is rendered impossible.

The letter A designates an extracting-tank, two of which are employed. They may be of any size or shape, although I prefer square tanks, in which the vegetable matter will not exceed eight feet in thickness when the tank is filled, a greater depth requiring a greater time to extract the oil. The dimensions of the tanks shown are ten feet square on inside and six feet high, the capacity of each tank being five hundred bushels of flaxseed, and they each may be worked out twice in twenty-four hours, the capacity of the rest of the apparatus being made to correspond to that amount, or two thousand bushels per day of twenty-four hours. Where larger mills are required the apparatus is increased in size. The vegetable matter should be finely disintegrated by grinding or crushing before being taken from warehouse. It is then brought by the conveyer $A'$ into the extracting-room, and falls through the chute $A^2$ into the tank A. When filled the chute $A^2$ is removed and a lid secured to the opening. The tank is now ready for the solvent, of which there are many that may be used; but from their cheapness and the provision made for their transportation the hydrocarbons from the distillation of petroleum will be found the most desirable. For my process I prefer the most volatile that can be procured, on account of the great rapidity with which it can be worked and the greater ease of its perfect separation from both oil and meal. Every part of the apparatus is vapor-tight. Consequently there can be no wastage, except through imperfect separation from the oil and meal. The solvent is now pumped into the tank A through the pipe $A^3$ until the tank is full, the air escaping through the pipe $a$. If the oil-cells are all broken by the disintegration, the combination of the oil and solvent takes place at once, and the combined oil and solvent may be drawn off as soon as the tank is full of the solvent.

The lower end of the tank is made slanting or converging to a central transverse depression, $A^5$, as shown, for ease in emptying, and is provided with a false bottom or screen, $a'$, composed of wire-cloth fine enough to prevent the passage of any meal, but allow the free passage of the oil and solvent. This wire-cloth should be protected by a perforated sheet-iron covering, and secured together about one inch above the bottom of the tank A. The oil being of greater density than the solvent, those particles of the mixture that are richest in oil will fall to the bottom of the tank first, and, passing through the screen $a'$, are discharged at once through the pipes $a^2$ $a^3$ to the tanks X Y, which should be located outside the room, as shown. The first running of the combined oil and solvent, which is the richest in oil, is directed through the pipe $a^2$ to one of the tanks, Y, and as soon as the mixture shows less than about twelve per cent. of oil the valve $a^4$ in the pipe $a^2$ first opened is closed, and the valve $a^5$ in the other pipe, $a^3$, is then opened, and the remaining solvent, together with what oil is still in the tank A, is thus directed to the other tank, X. The tank A meanwhile being supplied through the pipe $A^3$ and kept full of the solvent, as soon as the flow of the mixture shows but slight color from the presence of oil the supply of solvent to the tank A is stopped and the tank allowed to drain as thoroughly as it will.

In the use of a solvent with a specific gravity greater than that of oil—such as the bisulphide of carbon—it will be necessary to introduce the solvent at the bottom of the tank A, and the mixture will have to be drawn off at the top of the tank, in which case it will also be necessary to provide the tank A with a closely-fitting screen at the bottom of the neck $A^4$ to prevent the floating up of the meal with the solvent. All other proceedings will be the same as with the lighter solvent. At some point convenient for observation the pipes $a^2$ $a^3$ should be provided with a section of glass, through which the color of the mixture can be seen while drawing off. The contents of the tank A is now entirely free from oil, but is still saturated with the remains of the solvent, to remove which is the next proceeding.

The bottom of the tank A is provided with a screw-conveyer, B, as shown in Figs. 3 and 4. At the end where the meal is taken out the conveyer-shaft is provided with a short gudgeon, $b$, and about one and one-half inch of the end that projects through the bearing which is formed by the side of the tank A is made square, as at $x$. During the extraction of the oil the projecting end of the conveyer and the opening in the tank A through which the meal is discharged is closed by a cup-shaped cap, $b'$, screwed to the side of the tank A, with an intervening rubber gasket.

The chutes $B'$ are provided to direct the meal as discharged from the tank A into the evaporator C. These chutes have a loose but closely-fitting lid, $b^2$, as shown in Fig. 4, at each tank A, that is held in place simply by its weight. When it is desired to remove the meal the lid is lifted off, the cup-shaped cap $b'$ removed, and the shaft $B^2$, which is provided with the proper square sockets $b^3$, is engaged with the gudgeon $b$ on the conveyer B. Loose collars $b^4$ on the shaft $B^2$ are secured against the sides of the chutes $B'$, the lid $b^2$ replaced, and motion communicated to the conveyer B by belting or otherwise from the pulley $b^5$ on the shaft $B^2$. The shaft $B^2$ is constructed of such length that while engaged with the conveyer of one tank it is disengaged with that of the other. Each tank A might be provided with a separate shaft $B^2$.

Across the bottom of each tank A are four shafts, $B^3$, connected by a series of open-linked chains, $B^4$. One end of the shaft nearest the conveyer may be made square and project through the tank A opposite the discharge-opening for the meal, and a cup-shaped cap secured over this opening through the tank, through which said squared end of the shaft passes; or a stuffing-box can be provided. A socket-handle is provided for rotating the shaft. This construction is not shown in the drawings; but it will of course be readily understood, and the details are not material. Shortly after starting the conveyer B a short turn of the shafts $B^3$ is necessary to break the impact of the meal, which will then all roll down to the conveyer B by its gravity, except the final remnants, when a few turns of the shafts $B^3$ will entirely clear the tank A of the meal. The shaft $B^2$ is now disengaged, the caps $b'$ replaced, and the tank is ready for another charge.

The letter C indicates my improved evaporator. While any form of evaporator that will thoroughly agitate and heat the meal and that can be inclosed in a vapor-tight case will work in my process, the one herein shown is preferred. The evaporator C (see Fig. 6) is constructed of a hollow shaft, $C'$, around which and connected therewith is arranged a steam-coil, $C^2$, also eight longitudinal rows of short radial steam-pipes, $C^3$, one end inserted into the hollow shaft $C'$ and projecting out to the coil $C^2$, with the outer end closed.

$C^5$ is the outer galvanized sheet-iron case, that remains stationary at all times.

$c$ is an inner case, about one-half inch outside of the steam-coil $C^2$, but attached to the coil and revolving with the same when the evaporator is in operation. This case is also composed of galvanized sheet-iron, excepting about four feet near the center of the evaporator, which is composed of finely-woven wire-cloth $c'$, that will admit the free passage of vapor, but will arrest the finest particles of dust arising from the meal. This dust-screen is provided for the purpose of permitting the free passage of the vaporized solvent from the inner to the outer case, and to prevent the escape of any of the fine particles of meal, which would soon otherwise clog and render inoperative other parts of the process.

$C^4$ is the pulley by which the shaft $C'$, inner case, $c$, steam-coil $C^2$, and short pipes $C^3$, together with the meal, are rotated during the operation of the evaporators. $c^2$ $c^2$ are the bearings supporting the same. $c^3$ is the inlet steam-pipe with its stuffing-box, and $i$ is the steam-exit with its stuffing-box.

The inlet end of the evaporator is constructed as shown in Fig. 6. $C^5$ is the outer case; $c$, the inner case. D is the center plate, through which passes the main shaft $C'$, secured with a stuffing-box, and the meal-chute $B'$, which is soldered fast. Around the edge of the end plate of case $c$, between D and $c$ and $C^5$ and $c$, is placed a strip of woolen felt, and the plates being clamped together by the thumb-screw $D'$ forms a vapor-tight joint, at the same time permitting the rotation of the inner case, $c$.

The exit end of the evaporator C is also shown in Fig. 6. The inner case, $c$, is left entirely open at the end next the driving-pulley $C^4$, so that in rotating the coil the meal drops into the expanded bottom of the outer case, which forms the chute $C^6$. Felt packing $D^2$ is arranged over the edge of the annular plate or flange $c^4$ at this end of the evaporator, and also between $C^5$ and said flange, and the thumb-screw $D^3$ employed, which passes through an annular cap, $c^5$, and fits against a head, $c^6$, so that by tightening up the screw a vapor-joint will be formed.

The bottom of the chute $C^6$, into which the meal falls, is pierced by a number of small holes, $C^7$, through which the entrance of any desired amount of air may be controlled. The meal is lifted from the bottom of the chute by means of the flat screw-conveyer E, the worm being discontinued about one foot below the discharge $E'$, keeping the chute at this point always full of meal, and thus preventing a too great entrance of air. This conveyer may be rotated by the pulley $E^2$, or such other means as may be desired. The meal as discharged at $E'$ is finished, and may be soaked there or conveyed to another apartment.

In using a low-grade solvent it is difficult to entirely clear it from the meal.

In Fig. 12 I have shown a modified construction of evaporator, which may be used advantageously in such cases. It consists of an inclosed case, F, that is so hung or supported that a slight vibrating motion can be communicated to it by means of the cam $j'$. Through the center of this case is stretched a slightly inclining dust-screen, $f$. The meal falls onto the screen $f$ from the evaporator C through the chute $C^6$, spreads over and traverses the screen $f$, and is discharged through the chute $F^2$, constructed and operated as already described. Meanwhile an induced current of air is caused to pass through openings in the top of the case F, through the meal, and out at $f'$, carrying with it whatever final traces of the solvent that are in the meal. This evaporator F may be used instead of C, or in connection with and supplementary thereto.

The letter G indicates a vapor-pipe connecting the bottom of the outer case of the evaporator C with the fan $G'$, which induces a current of air from the bottom of the chute $C^6$ through the chute into the inner case of the evaporator C, thence, with the vaporized solvent, through the dust-screen $c$, into the outer case of the evaporator, and from thence through the pipe G into the fan-case $G'$, and from there the combined vapor and air is forced by the fan into the condenser H through the pipe $g$. (See Fig. 1.) The condensed solvent falls through the pipe $g'$ into one of the tanks, Z, and the air escapes through the pipe $g^2$. Almost any form of condenser may be employed. The one shown in Fig. 7 consists of a square box about eight feet long with an inner head, $y$, at each end, between which are inserted as many small pipes as can be inserted. Water is introduced into the body of the condenser at $H'$ and taken away at $H^2$. As the ingress of air into the evaporator C is restricted by valves in a branched pipe, T, the fan $G'$ maintains a partial vacuum in the evaporator. The greater the vacuum the more rapid will be the extraction of the solvent; but sufficient air must be admitted at all times to perfectly fill all cells and spaces in the meal, or a perfect elimination of the solvent cannot be accomplished, and hence the outlet of air through the pipe $g^2$ is also restricted by said valves. The fan $G'$ at the same time maintains a slight pressure in the condenser H. The greater the pressure the more perfect will be the condensation of the solvent. The solvent condensed in the condenser H is conveyed to the tank Z by the pipe $g'$.

The storage-tanks X Y Z, the extracting-tanks A, and the condenser H are all connected by a system of air or ventilating pipes, U, with one branched outlet, T, which should extend above the roof of the building. Each of these branches is provided with a lightly-weighted valve, one, $T'$, opening upward, and another, $T^2$, opening inward, as shown in Figs. 1 and 3.

In emptying or filling the various tanks air must be admitted and discharged. These valves, restricting a free flow of the air either outward or inward, prevent any but a very slight waste of the solvent under any ordinary temperature. By means of the valves the pressure can be varied to suit the circumstances.

The letter I designates an iron tank supported on metal brackets secured to the wall of the building and sufficiently elevated for its contents to run by gravity through the pipe $i'$ into the separating-column J, Figs. 10 and 11, which consists of a metal case inclosing a column of open iron pans, K. A top view of one of the pans is shown in Fig. 11. Each pan has a flanged rim, $k$, from three to four inches high, and the bottom of each pan is covered by a three-quarter-inch flat coil of copper steam-pipe, $k'$. The pans, as shown, are four feet in diameter, and should be slightly depressed in the center, not to exceed one-quarter inch below a level. A pipe, $k^2$, is introduced from below into the center of each pan, and by an elbow, $k^3$, carried to the outside of the separator J and connected with the perpendicular pipe J′, each pipe $k^3$ being provided with a valve or stop-cock, $j$, just before entering said pipe J′. Just before passing through the case J each of the pipes $k^3$ is provided with a rising branch, $l$, which should ascend until about the height of the center of the iron pans. Then, turning to a horizontal, they pass through the case J and also enter the pipe J′.

In operation the mixture from the storage-tanks X or Y, containing the solvent and abstracted oil, is pumped into the tank I, and from thence flows through the pipe $i′$, and by means of the valves in the pipes $i^2$ is introduced in a graduated stream into the separator J and discharged into the pans K in not less than four equidistant places near the outer edge of each of said pans. But one discharge is shown; but of course the pipes can be so arranged as to deliver the oil into the pans at four points, and it is deemed unnecessary to show them in the drawings. The coils being heated with steam, the solvent as vaporized passes over the edges of the pans and falls to the bottom of the separator J. The vapors from the hydrocarbons of petroleum are heavier than air and should always fall from the point of vaporization to that of condensation. The vapor then passes through the pipe L into the condenser H′, which may be similar in construction to the condenser H. From thence the condensed solvent passes through the pipe N to the storage-tank Z, or some other tank of suitable capacity, to be used over again. The oil remaining in the pans K falls into the pipe $k^3$, and the valves in said pipes being closed, it rises in the branch pipes $l$ and pans until it reaches a level with the outlet of the branch pipes, when the oil passes off through the pipe J′. The pipes should be so arranged that the steam-coil on the pans will be covered to the depth of about one-quarter of an inch.

It is essential to the best working of this form of separator that the oil should be taken from the bottom of the pans, for as the solvent is vaporized those particles of oil that are the most perfectly freed are the first to descend to the bottom of the pans, displacing those particles that are less free from the solvent, whence the purest oil in the pans flows off, whereas in case of an overflow, as generally used, evaporization is only effected from a thin surface, as the pans will simply stand full of hot oil, and the overflow must at all times be highly charged with the solvent.

When it is desired to discontinue the process of separation and the supply of mixture (solvent and oil) is cut off from the separator J the oil is perfectly drained from pans and pipes, for if permitted to stand in the pans the oil becomes carbonized on the hot pipes and discolored.

The case J is provided with glass panes O at each pan, Figs. 10 and 11, through which the process of separation may be observed, and hence the flow of mixture can be regulated.

In the pipe J′, below the lowest pan, is a branch pipe, P, leading into the superheater Q, containing the superheated-steam train of pipes $Q^2$. (See Figs. 8 and 9.) The pipe P is provided with a valve or stop-cock, and another will be placed in the pipe J′ just below the pipe P.

When the separation is first commenced the first flow of oil is generally highly charged with the solvent. The valve in pipe P being closed and the one in pipe J′ being open, the oil flows back to its proper tank of storage, X or Y, through the pipe $y$. As soon as the oil flows free from the solvent, which can be observed through a glass section that should be inserted at some point in pipe J′ below the shelves or pans, the valve in the pipe P is opened and the one in pipe J′ is closed and the oil flows into the superheater Q. This superheater is composed of a long metal box, Q′, containing an iron trough, the bottom of which is covered with pipes $Q^2$, into which is introduced superheated steam, made sufficiently hot to raise the temperature of the oil poured upon them to about 400° to 450° Fahrenheit. The inclosed trough has a slight falling inclination from the end where the oil is introduced to that where it is discharged. About two feet from the latter point the steam-pipes are stopped and an agitator, R, introduced. Any form of agitator will answer that will thoroughly churn the oil into foam. This, with the high temperature, will cause the total elimination of every particle of the solvent. All boxes or bearings for this agitator should be outside the superheater Q, and the agitating-arms should only come in contact with the oil.

At some convenient point on the superheater a pyrometer should be placed, and hence the heat can be regulated as may be required. Upon leaving the superheater the temperature of the oil should be reduced to the point of boiling water to prevent discoloration. The freed vapor in the superheater passes through the pipe S into the condenser H′, and thus returns to its tank Z. The oil as soon as cooled may be pumped to a storage-tank, or any disposition desired can be made of it, thus completing the process of extracting oil by my improved process, which may be continuously, cheaply, and efficiently carried on by means of the organization of apparatus described.

In Fig. 5 a casing is provided, so that a passage is formed from the pan-case to the case H, while in Fig. 1 a pipe, $g$, takes the place of such passage. It is evident that both constructions can be employed with like effect.

What I claim is—

1. The combination of the tanks A, in which the solvent and vegetable substance are mixed, the reservoirs X Y, the connecting-pipes, and the herein-described evaporator C, and the condenser H, both constructed substantially as set forth.

2. The combination of the tanks A A with the conveyer B, chutes B′, the evaporator C, the superheater Q, pipe $u$, and condenser H, constructed and organized substantially as described.

3. The tank A, having the inclined bottom and screen $a'$, shafts $B^3$, open-link chains $B^4$, conveyer B, and chute $B'$.

4. The combination of the outer casing, C, of the evaporator, its hollow shaft, the inner revolving casing, $c$, and the steam-pipes disposed therein, substantially as set forth.

5. The combination of the outer casing of the evaporator C, the inner revolving casing, $c$, having the perforated or woven-wire portion $c'$, and the condenser H, substantially as set forth.

6. The evaporator C, composed of an outer case and an inner rotary case, the hollow shaft, and the radiating steam-pipes, substantially as described.

7. The combination of the evaporator C, formed in two parts with a vapor-space between them, the condenser H, the pipe connecting the condenser and vapor-space, the pipe leading to the reservoir, and a fan, $G'$, substantially as and for the purpose set forth.

8. The combination of the evaporator C, having an inner and an outer case, with a vapor-space between them, its discharge-chute $C^6$, having a perforated bottom, and the delivery conveyer-screw E, in combination with the fan $G'$ and the condenser H, substantially as set forth.

9. The combination of the tanks A, the evaporator C, the fan $G'$, the condenser H, the reservoirs, the system of ventilating-pipes, the branch outlet-pipe, and its inlet and outlet valves, substantially as set forth.

10. The evaporator F, the cam for vibrating it, its inclined dust-screen $f$, its inlet and outlet chutes, and its draft or air outlet $f'$, substantially as set forth.

11. The combination of the evaporator C, its chute $C^6$, the supplementary vibratory evaporator F, the inclined screen $f$ therein, its outlet-chute, and the draft-opening $f'$, leading to the condenser, substantially as set forth.

12. The combination of the separator-case J, the pans K, a steam-coil in each pan, the inlet-pipes $i'$, the oil-outlet pipe $k^2$ for each pan, its elbow $k^3$, and the discharge-pipe $J'$, substantially as set forth.

13. The evaporating or separating pan herein described, having the oil-discharge pipe connected to its bottom, so that the purest oil, or that having the least amount of solvent with it, and which is heaviest, will be first delivered from the pan.

14. The separator J herein described, provided with evaporating-pans and inlet and discharge pipes, and having the glass panel, substantially as described.

15. The combination of the separator J, the outlet-pipe $J'$, its valve, the superheater Q, the pipe P and its valve, and the condenser M, substantially as set forth.

16. The combination of the superheater, the steam-pipes and agitator therein, and the condenser M.

17. The combination, with the separator, the evaporator, and the condenser, of the ventilating-pipes $u$, the branch T, and the valves $T'$ $T^2$, combined and arranged as specified.

In testimony whereof I have hereunto set my hand in the presence of two subscribing witnesses.

MORRIS LANCASTER.

Witnesses:
JAMES L. NORRIS,
JAMES A. RUTHERFORD.